United States Patent Office 3,268,513
Patented August 23, 1966

3,268,513
PROCESS FOR PRODUCING 6-(α-AMINO-ACYL-AMINO-ACYLAMINO)-PENICILLANIC ACIDS
Norman H. Grant, Wynnewood, and Harvey E. Alburn, West Chester, Pa., assignors to American Home Products Corporation, New York, N.Y., a corporation of Delaware
No Drawing. Filed Mar. 20, 1964, Ser. No. 353,574
3 Claims. (Cl. 260—239.1)

This invention relates generally to preparation of penicillins and more particularly to a novel method for preparing 6-(α-amino - acylamino-acylamino)-penicillanic acids additionally substituted on the alpha carbon atom; and non-toxic salts thereof.

In U.S.P. 2,985,648 there are disclosed certain penicillanic acid derivatives which may be described generally as 6-(α-aryl-α-amino-acylamino)-penicillanic acids.

In the said penicillanic acid derivatives, as referred to in said patent, the alpha-carbon atom of the acyl group (to which the alpha-amino and alpha-aryl groups are attached) is an asymmetrical carbon atom and the compounds can therefore exist in two optically active isomeric forms [the D-(—) and L (+) diastereoisomers], as well as in the optically inactive DL form, which is a mixture of two optically active forms.

As stated in U.S.P. 2,985,648, the compounds disclosed therein are of value as antibacterial agents, nutritional supplements in animal feed; agents for the treatment of mastitis in cattle; and as therapeutical agents in poultry and mammals, including man, in the treatment of infectious diseases caused by Gram-positive and Gram-negative bacteria, upon either parenteral or oral administration. Moreover, the compounds show marked resistance to destruction by acids.

The method disclosed in said U.S.P. 2,985,648 for preparing the 6-(α-aminoacylamino)-penicillanic acids coming within the formula set forth in that patent generally comprises reaction of 6-amino-penicillanic acid with an alpha-amino benzyl acid halide or anhydride in which the amino group has previously been provided with a protecting acyl group, such as PhCH₂OCO—, or some other functionally equivalent protecting group. To recover the desired alpha-amino benzyl penicillanic acid derivative, it is necessary to remove the protecting group by catalytic hydrogenation under sufficiently mild conditions to avoid destruction of the penicillin nucleus and the newly-formed amide linkage. Thus, in accordance with this known method, it is necessary to proceed through four separate operational steps as follows: (1) the amino group of the amino acid reactant to be used has to be blocked with a protecting acyl group, (2) the anhydride has to be formed from the protected amino acid, (3) the protected anhydride has to be reacted with 6-aminopenicillanic acid, and then (4) the protecting group must be removed by catalytic hydrogenation to obtain the desired penicillanic acid derivative.

While, as already stated, it is known that the specific blocking group referred to above may be replaced by another functionally equivalent protecting group; in all instances heretofore disclosed, the subsequent removal of the protecting group by catalytic hydrogenation has been necessary to obtain the free 6-(α-aminoacylamino)-penicillanic acid derivative. Unfortunately for the efficient application of this prior art method, the penicillin molecule possesses a sulfur atom and, as is well known in the art, sulfur is a hydrogenation catalyst poison. This inherent characteristic of sulfur-containing molecules has made it extremely difficult to obtain pure 6-(α-aminoacylamino)-penicillanic acids in high yields by said method.

We have now discovered a novel process for the production of a large group of substituted 6-(α-aminoacylamino)-penicillanic acids of a novel type neither contemplated in, nor practicably preparable by, the method of said U.S.P. 2,985,648, whereby high yields of high purity product can be efficiently and economically obtained.

It is a distinctive feature of our invention that the catalytic hydrogenation step which has heretofore presented so much difficulty in the preparation of simpler 6-(α-aminoacylamino)-penicillanic acids is unnecessary, thus providing an efficient, productive and economic procedure for preparing a whole new series of substituted 6-(α-aminoacylamino)-penicillanic acids. Another most important feature of the present invention is that the use of organic solvents in the reaction mixtures employed in the exercise of the method of the present invention has not only been found unnecessary, but to the contrary, it has been found that the presence of such solvents is actually detrimental to the excellent yields otherwise obtainable with our novel method. Moreover, our novel method enables the facile production of the aforementioned novel categories of substituted 6-(α-aminoacylamino)-penicillanic acids not even remotely contemplated in U.S.P. 2,985,648, as will appear hereinafter.

The process of our invention generally comprises the reaction of a substituted-2,5-oxazolidinedione (also known as an N-carboxy amino acid anhydride), as defined below, with a 6-(α-aminoacylamino)-penicillanic acid in an aqueous medium having a pH of from about 3.8 to 7.4. The reaction may be represented schemtaically as follows:

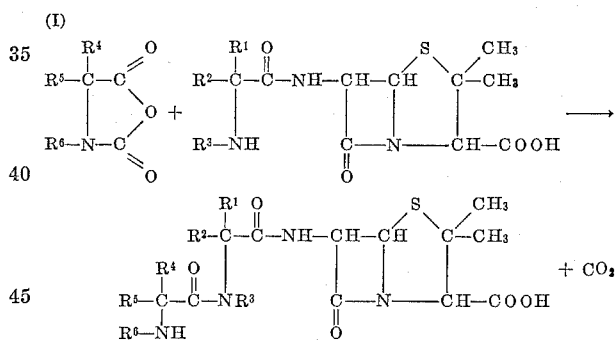

wherein $R^1$, $R^2$, $R^3$, $R^4$, $R^5$, and $R^6$ each may represent a member selected from the group consisting of hydrogen, aryl, alkaryl, aralkyl, saturated alkyl, unsaturated alkyl, cycloalkyl, and heterocyclic radicals; $R^2$ and $R^5$ each may further represent a member selected from the group consisting of indolylalkyl, substituted indolylalkyl, alkylthioalkyl and amidoalkyl; $R^1$ and $R^2$ may be joined to complete a hydrocarbon ring; $R^4$ and $R^5$ may be joined to complete a hydrocarbon ring; $R^2$ and $R^3$ may be joined to complete a heterocyclic ring; $R^5$ and $R^6$ may be joined to complete a heterocyclic ring; and $R^1$, $R^2$, $R^3$, $R^4$, $R^5$ and $R^6$, when separate radicals or completing rings as defined, may carry substituents such as those disclosed for aryl in said U.S.P. 2,985,648, and above.

The classic methods for preparing the substituted-2,5-oxazolidinediones include (a) the carboalkoxy procedure, (b) the azide rearrangement procedure, and (c) the phosgenation procedure. These methods, of which phosgenation is preferred, have the desirable feature that they do not change the steric configuration when an asymmetric carbon is present. The reaction for preparing the substituted-2,5-oxazolidinediones by phosgenation as in method (c) generally comprises the reaction of a suitable amino acid and phosgene and may be represented schematically as follows:

(II)

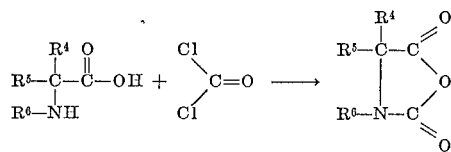

wherein $R^4$, $R^5$ and $R^6$ may have the same meaning as in (I) above.

Preferably, in said phosgenation procedure, the amino acid reactant is dissolved or suspended in dioxane, phosgene is introduced into the reaction mixture, and the resulting anhydride is crystallized by the addition of an agent such as benzene.

The amino acid reactant may, in certain instances, have the amino group thereof as a substituent on a phenyl group that is directly attached to the carboxyl group of the acid by a carbon atom of the benzene ring, said atom being ortho to the carbon atom to which the amino group is attached. Stated otherwise, the amino group is attached to a carbon atom that is in the beta position with respect to the carboxyl group of the acid rather than to the carbon atom alpha thereto, as is more usual for the amino acids. The phenyl group, moreover, may be substituted in each of the remaining four positions of the benzene ring as referred to hereinafter or two adjacent substituents may be joined to form an aryl or alicyclic ring. Thus, the alternative amino acid starting materials suitable for the ultimate production of penicillin derivative compounds of the present invention may be represented by the following formula:

(III)

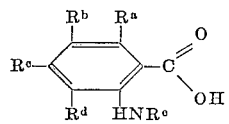

wherein each of $R^a$, $R^b$, $R^c$ and $R^d$ are of the group consisting of hydrogen, alkyl, amino, nitro, sulfo, halo and hydroxy; $R^e$ is of the group consisting of hydrogen and lower alkyl; and $R^a$ and $R^b$, $R^b$, and $R^c$, and $R^c$ and $R^d$, when respectively joined, complete a ring of the group consisting of aryl and alicyclic.

Accordingly, the reaction between phosgene and the aryl amino acids, which are also suitable as starting materials in the production of the penicillanic acid derivatives of the present invention, may be represented by a similar equation as follows:

(IV)

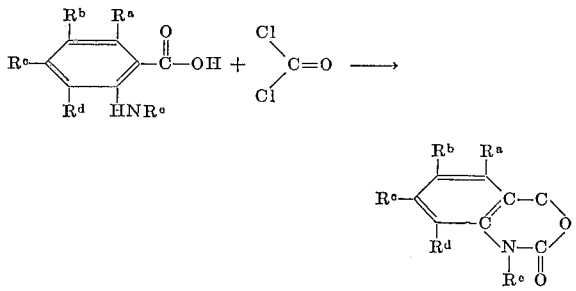

wherein $R^a$, $R^b$, $R^c$, $R^d$ and $R^e$ may have the same meaning as in Formula III above. As before, in said phosgenation procedure, the amino acid reactant is preferably dissolved or suspended in dioxane, phosgene is introduced into the reaction mixture, and the resulting anhydride is crystallized by the addition of an agent such as benzene.

Several methods for preparation of the 6-(α-amino-acylamino)-penicillanic acid are now available in the art, including the method referred to in said U.S.P. 2,985,648, and hence need not be described here. In this connection, in lieu of a 6-(α-amino-acylamino)-penicillanic acid, the salts thereof, such as the sodium or potassium salts, prepared in conventional manner from the acid, may be substituted in the reaction mixtures containing the selected N-carboxy-anhydride. However, due to the basicity of such salts, adjustment of the reaction mixtures containing them is required to bring them within the specified pH range, else the yields obtained therefrom are undesirably diminished.

In the preferred exercise of the method of the present invention, the substituted-2,5-oxazolidinedione chosen is reacted with the selected 6-(α-amino-acylamino)-penicillanic acid in approximately equimolar quantities in a cold aqueous solution in the pH range from about 3.8 to about 7.4 referred to hereinbefore and preferably in the range 4.7–7.0. The mixture is stirred for several hours at a temperature from just above the freezing point of the aqueous mixture to about 37° C., and preferably in the range 0–10° C. Although not essential, it may be preferred to include a buffer having an ionic strength of above 0.2, preferably about 0.3, to aid in keeping the reaction mixture within the required pH range. Suitable buffers for maintaining the desired pH may be any mixture of organic or inorganic water-soluble acids, bases, or salts such as sodium acetate-acetic acid, calcium acetate-acetic acid, pyridine-acetic acid, formic acid-ammonia, etc. Alternatively, the reaction mixture may be maintained within the requisite pH range by careful addition of a base such as NaOH or the like. The introduction of any substantial amount of organic solvent into the reaction mixture is preferably avoided in order to obtain the advantages of our inventive method with respect to yield and overall cost.

The surprising nature of our discovery becomes the more evident when it is noted that there has been a definite tendency of workers in the field of peptide synthesis to discourage the use of 2,5-oxazolidinediones as reagents in the reaction with amino acids, even in the preparation of small peptides, because of the tendency of the 2,5-oxazolidinediones to hydrolyze and to polymerize. The consensus of these workers appears to be summarized in the statement of Greenstein and Winitz in "Chemistry of the Amino Acids," 1961, John Wiley & Sons, Inc., New York, New York, vol. II, at p. 876, as follows:

"Evaluation of the Method. The general marked lability of N-carboxy amino acid anhydrides in the presence of traces of moisture, as well as the special precautions required during their controlled condensation with a suitably constituted amine, has discouraged the widespread use of these reactants in the stepwise synthesis of small peptides."

Moreover, assuming that the inventive concept involved in even employing the 2,5-oxazolidinediones as reagents in the reactions with the 6-(α-amino-acylamino)-penicillanic acids to obtain the desired penicillin products, has been conceived; it would then, as a matter of course, suggest itself to one skilled in the art to employ an organic solvent in the reaction mixture as necessary because of the insolubility, or at best, limited solubility of the oxazolidinedione reactants present. However, as referred to previously, we have found that, surprisingly, inclusion of such solvents significantly reduces to product yield. For example, the presence of organic solvent in the aqueous reaction medium employed in the exercise of the present invention, in amount as little as 5% by volume of said medium, has been found to cause undesirable reductions in yields.

Furthermore, in view of the unique characteristics of 6-(α-amino-acylamino)-penicillanic acids our discovery is even more surprising since the 6-(α-amino-acylamino)-penicillanic acids will either polymerize or simply be hydrolyzed under certain conditions due to the fact that the lactam linkage present in their structures is a sensitive one. These properties would tend to suggest to skilled workers in the art that the reaction with 2,5-oxazolidinediones could not proceed to any appreciable extent without decomposition, hydrolysis, polymerization, side reactions, etc. Contrariwise, however, under the closely controlled pH, aqueous medium conditions of our invention, high yields of relatively pure product are possible.

The following examples, illustrative of our invention, are by no means to be considered limitative thereof.

*Example I.—6-[L-2-(D-2-amino-2-phenylacetamido)-4-methylvaleramido]penicillanic acid*

Mix 395 mg. (1.2 millimoles) of 6-(L-2-amino-4-methylvaleramido)-penicillanic acid with 212 mg. (1.2 millimoles) of D-phenylglycine-N-carboxyanhydride in 30 ml. of ice-cold water. Stir at 1–2° for 60 minutes, keeping the pH at 6.0 by the addition of 1 N NaOH. Filter, and freeze-dry the filtrate. The product is active against Staph. aureus and E. coli.

*Example II.—6-[2-(D-2-amino-4-methylvaleramido)acetamido]penicillanic acid*

Mix 218 mg. (0.8 millimole) of 6-(2-aminoacetamido)penicillanic acid with 126 mg. (0.8 millimole) of the N-carboxyanhydride of D-leucine in 20 ml. of ice-cold water. Stir at 1–2° for 60 minutes, keeping the pH at 6.0 by the addition of 1 N NaOH. Filter, and freeze-dry the filtrate. The product is active against both Staph. aureus and E. coli.

*Example III*

When in the procedure of Example II, the N-carboxyanhydride of D-leucine is replaced by 0.8 millimoles of the N-carboxyanhydride of (1) glycine
(2) D-phenylglycine
(3) D-phenylalanine
(4) L-phenylalanine
(5) 1-aminocyclobutanecarboxylic acid
(6) 1-aminocyclopentanecarboxylic acid
(7) 1-aminocyclohexanecarboxylic acid
(8) 1-aminocyclooctanecarboxylic acid
(9) anthranilic acid
(10) 2-amino-5-nitrobenzoic acid
(11) 2-amino-5-chlorobenzoic acid
(12) D-tryptophan
(13) L-tryptophan
(14) L-cystine
(15) DL-phenylsarcosine
(16) N-phenylglycine
(17) DL-o-ethoxyphenylglycine respectively, the following corresponding penicillin derivatives, all active against Gram-positive and Gram-negative microorganisms, are produced:

(1) 6-[2-(2-aminoacetamido)acetamido]penicillanic acid
(2) 6-[2-(D-2-amino-2-phenylacetamido)acetamido]penicillanic acid
(3) 6-[2-(D-2-amino-3-phenylpropionamido)acetamido]penicillanic acid
(4) 6-[2-(L-2-amino-3-phenylpropionamido)acetamido]penicillanic acid
(5) 6-[2-(1-aminocyclobutanecarboxamido)acetamido]penicillanic acid
(6) 6-[2-(1-aminocyclopentanecarboxamido)acetamido]penicillanic acid
(7) 6-[2-)1-aminocyclohexanecarboxamido)acetamido]penicillanic acid
(8) 6-[2-(1-aminocyclooctanecarboxamido)acetamido]pencillanic acid
(9) 6-[2-(2-aminobenzamido)acetamido]penicillanic acid
(10) 6-[2-(2-amino-5-nitrobenzamido)acetamido]penicillanic acid
(11) 6-[2-(2-amino-5-chlorobenzamido)acetamido]penicillanic acid
(12) 6-[2-(D-α-aminoindole-3-propionamido)acetamido]penicillanic acid
(13) 6-[2-(L-α-aminoindole-3-propionamido)acetamido]penicillanic acid
(14) bis[6-(2-[L-3-thio-2-aminopropionamido]acetamido)penicillanic acid]
(15) 6-[2-(DL-2-amino-N-methyl-2-phenylacetamido)acetamido]penicillanic acid
(16) 6-[2-(2-anilinoacetamido)acetamido]penicillanic acid
(17) 6-[2-(DL-2-amino-2-o-ethoxyphenylacetamido)acetamido]penicillanic acid

*Example IV.—6-[D-2-(2-aminoacetamido)-4-methylvaleramido]penicillanic acid*

Mix 263 mg. (0.8 millimole) of 6-(D-2-amino-4-methylvaleramido)-penicillanic acid with 80 mg. (0.8 millimole) of the N-carboxyanhydride of glycine in 20 ml. of ice-cold water. Stir at 1–2° for 60 minutes, keeping the pH at 6.0 by the addition of 1 N NaOH. Filter, and freeze-dry the filtrate. The product is active against both Staph. aureus and E. coli.

*Example V*

When in the procedure of Example IV, the N-carboxyanhydride of glycine is replaced by 0.8 millimole of the N-carboxyanhydride of (1) D-leucine
(2) D-phenylglycine
(3) D-phenylalanine
(4) L-phenylalanine
(5) 1-aminocyclobutanecarboxylic acid
(6) 1-aminocyclopentanecarboxylic acid
(7) anthranilic acid
(8) 2-amino-5-nitrobenzoic acid
(9) D-tryptophan
(10) L-tryptophan
(11) D-methionine
(12) L-cystine
(13) DL-phenylsarcosine
(14) N-phenylglycine respectively, the following corresponding penicillin derivatives, all active against Gram-positive and Gram-negative microorganisms, are produced:

(1) 6-[D-2-amino-4-methylvaleramido)-4-methylvaleramido]penicillanic acid
(2) 6-[D-2-(D-2-amino-2-phenylacetamido)-4-methylvaleramido]penicillanic acid
(3) 6-[D-2-(D-2-amino-3-phenylpropionamido)-4-methylvaleramido]penicillanic acid
(4) 6-[D-2-(L-2-amino-3-phenylpropionamido)-4-methylvaleramido]penicillanic acid
(5) 6-[D-2-(1-aminocyclobutanecarboxamido)-4-methylvaleramido]penicillanic acid
(6) 6-[D-2-(1-aminocyclohexanecarboxamido)-4-methylvaleramido]penicillanic acid
(7) 6-[D-2-(2-aminobenzamido)-4-methylvaleramido]penicillanic acid
(8) 6-[D-2-(2-amino-5-nitrobenzamido)-4-methylvaleramido]penicillanic acid
(9) 6-[D-2-(D-α-aminoindole-3-propionamido)-4-methylvaleramido]penicillanic acid
(10) 6-[D-2-(L-α-aminoindole-3-propionamido)-4-methylvaleramido]penicillanic acid
(11) 6-(D-2-[D-2-amino-4-(methylthio)butyramido]-4-methylvaleramido)penicillanic acid
(12) bis[6-(D-2-[L-3-thio-2-aminopropionamido]-4-methylvaleramido)penicillanic acid]
(13) 6-[D-2-(DL-2-amino-N-methyl-2-phenylacetamido)-4-methylvaleramido]-penicillanic acid
(14) 6-[D-2-(2-anilinoacetamido)-4-methylvaleramido]penicillanic acid

*Example V.—6[L-2-(D-2-amino-2-phenylacetamido)phenylpropionamido]penicillanic acid*

Mix 43 mg. (1.2 millimoles) of 6-(L-2-aminophenylpropionamido)penicillanic acid with 212 mg. (1.2 millimoles) of D-phenylglycine-N-carboxyanhydride in 30 ml. of ice-cold water. Stir at 1–2° for 60 minutes, keeping the pH at 6.0 by the addition of 1 N NaOH. Filter, and freeze-dry the filtrate. The product is active against *Staph. aureus* and *E. coli*.

*Example VII.—6-[D-2-(2-aminoacetamido)-2-phenylacetamido]penicillanic acid*

Mix 420 mg. (1.2 millimoles) of 6-(D-2-amino-2-phenylacetamido)-penicillanic acid with 121 mg. (1.2 millimoles) of glycine-N-carboxyanhydride in 30 ml. of ice-cold water. Stir at 1–2° for 60 minutes, keeping the pH at 6.0 by the addition of 1 N NaOH. Filter, and freeze-dry the filtrate. The product is active against both *Staph. aureus* and *E. coli*.

*Example VIII.—6[D-2-(D-2-amino-2-phenylacetyl)amino-2-phenylacetamido]penicillanic acid*

Mix 50 mg. of ampicillin and 20 mg. of D-phenylglycine N-carboxyanhydride in 5 ml. of 0.1 M sodium acetate-acetic acid buffer at pH 4.7. Stir at 1° C. for 2 hours. Filtrate and concentrate, after which agar plate assays against *E. coli* and hydroxylamine determinations of total β-lactam demonstrate the formation of the new antibiotic having the following elemental analysis:

Found: C, 58.6; H, 5.60; N, 11.20; S, 6.2. Calculated for $C_{24}H_{26}N_4S$: C, 59.8; H, 5.39; N, 11.61; S, 6.64.

*Example IX*

When in the procedure of Example VII, the N-carboxyanhydride of glycine is replaced by 1.2 millimoles of the N-carboxyanhydride of (1) D-leucine
(2) L-leucine
(3) D-phenylglycine
(4) D-phenylalanine
(5) L-phenylalanine
(6) 1-aminocyclobutane carboxylic acid
(7) 1-aminocyclopentane carboxylic acid
(8) 1-aminocyclohexane carboxylic acid
(9) 1-aminocyclooctane carboxylic acid
(10) 2-amino-5-nitrobenzoic acid
(11) 2-amino-5-chlorobenzoic acid
(12) 2-amino-5-methylbenzoic acid
(13) D-tryptophan
(14) L-tryptophan
(15) D-methionine
(16) DL-phenylsarcosine
(17) N-phenylglycine
(18) DL-glutamine
(19) DL-o-ethoxyphenylglycine
(20) cystine
(21) D-phenylglycine respectively, the following corresponding penicillin derivatives, all active against Gram-positive and Gram-negative microorganisms, are produced:

(1) 6-[D-2-(D-2-amino-4-methylvaleramido)-2-phenylacetamido]penicillanic acid
(2) 6-[D-2-(L-2-amino-4-methylvaleramido)-2-phenylacetamido]penicillanic acid
(3) 6-[D-2-(D-2-amino-2-phenylacetamido)-2-phenylacetamido]penicillanic acid
(4) 6-[D-2-(D-2-amino-3-phenylpropionamido)-2-phenylacetamido]penicillanic acid
(5) 6-[D-2-(L-2-amino-3-phenylpropionamido)-2-phenylacetamido]penicillanic acid
(6) 6-[D-2-(1-amino-cyclobutanecarboxamido)-2-phenylacetamido]penicillanic acid
(7) 6-[D-2-(1-aminocyclopentanecarboxamido)-2-phenylacetamido]penicillanic acid
(8) 6-[D-2-(1-amino-cyclohexanecarboxamido)2-phenylacetamido]penicillanic acid
(9) 6-[D-2-(1-amino-cyclooctanecarboxamido)-2-phenylacetamido]penicillanic acid
(10) 6-[D-2-(2-amino-5-nitrobenzoic)-2-phenylacetamido]penicillanic acid
(11) 6-[D-2-(2-amino-5-chlorobenzamido)-2-phenylacetamido]penicillanic acid
(12) 6-[D-2-(2-amino-5-methylbenzamido)-2-phenylacetamido]penicillanic acid
(13) 6-[D-2-(D-α-aminoindole-3-propionamido)-2-phenylacetamido]penicillanic acid
(14) 6-[D-2-(L-α-aminoindole-3-propionamido)-2-phenylacetamido]penicillanic acid
(15) 6-[D-2-(D-2-amino-4-methylthiobutyramido)-2-phenylacetamido]penicillanic acid
(16) 6-[D-2-(DL-2-amino-N-methyl-2-phenylacetamido-2-phenylacetamido]penicillanic acid
(17) 6-[D-2-(2-anilinoacetamido)-2-phenylacetamido]penicillanic acid
(18) 6-[D-2-(DL-2-aminoglutaramido)-2-phenylacetamido]penicillanic acid
(19) 6-[D-2-(DL-2-amino-2-o-ethoxyphenylacetamido-2-phenylacetamido]penicillanic acid
(20) bis[6-(D-2-[L-3-thio-2-aminopropionamido]2-phenylacetamido]penicillanic acid
(21) 6-[D-2-(2-aminobenzamido-2-phenylacetamido]penicillanic acid

*Example X.—6-[1-(D-2-amino-2-phenylacetamido)cyclobutanecarboxamido]penicillanic acid*

Mix 376 mg. (1.2 millimoles) of 6-(1-aminocyclobutanecarboxamido)-penicillanic acid with 212 mg. (1.2 millimoles) of D-phenylglycine-N-carboxyanhydride in 30 ml. of ice-cold water. Stir at 1–2° for 60 minutes, keeping the pH at 6.0 by the addition of 1 N NaOH. Filter, and freeze-dry the filtrate. The product is active against *Staph. aureus* and *E. coli*.

*Example XI.—6-[1-(D-2-amino-4-methylvaleramido)cyclopentanecarboxamido]penicillanic acid*

Mix 523 mg. (1.6 millimoles) of 6-(1-aminocyclopentanecarboxamido)-penicillanic acid with 252 mg. (1.6 millimoles) of the N-carboxyanhydride of D-leucine in 40 ml. of ice-cold water. Stir at 1–2° for 60 minutes, keeping the pH at 6.0 by the addition of 1 N NaOH. Filter, and freeze-dry the filtrate. The product is active against both *Staph. aureus* and *E. coli*.

*Example XII*

When in the procedure of Example XI, the N-carboxyanhydride of D-leucine is replaced by 1.6 millimoles of the N-carboxyanhydride of (1) D-phenylglycine
(2) D-phenylalanine
(3) L-phenylalanine
(4) 1-aminocyclopentane carboxylic acid
(5) anthranilic acid
(6) 2-amino-5-nitrobenzoic acid
(7) D-tryptophan
(8) L-tryptophan
(9) DL-phenylsarcosine
(10) N-phenylglycine
(11) L-proline
(12) DL-o-ethoxyphenylglycine
(13) cystine respectively, the following corresponding penicillin derivatives, all active against Gram-positive and Gram-negative microorganisms, are produced (1) 6-[1-(D-2-amino-2-phenylacetamido)cyclopentanecarboxamido]penicillanic acid
(2) 6-[1-(D-2-amino-3-phenylpropionamido)cyclopentanecarboxamido]penicillanic acid (3) 6-[1-(L-2-amino-3-phenylpropionamido)cyclopentanecarboxamido]penicillanic acid
(4) 6-[1-(1-aminocyclopentanecarboxamido)cyclopentanecarboxamido]penicillanic acid
(5) 6-[1-(2-aminobenzamido)cyclopentanecarboxamido]penicillanic acid
(6) 6-[1-(2-amino-5-nitrobenzamido)cyclopentanecarboxamido]penicillanic acid
(7) 6-[1-(D-α-aminoindole-3-propionamido)cyclopentanecarboxamido]penicillanic acid
(8) 6-[1-(L-α-aminoindole-3-propionamido)cyclopentanecarboxamido]penicillanic acid
(9) 6-[1-(DL-2-amino-N-methyl-2-phenylacetamido)-cyclopentanecarboxamido]penicillanic acid
(10) 6-[1-(2-anilinoacetamido)cyclopentane carboxamido]penicillanic acid
(11) 6-[1-(L-2-pyrrolidinecarboxamido)cyclopentanecarboxamido]penicillanic acid
(12) 6-[1-(DL-2-amino-2-o-ethoxyphenylacetamido)-cyclopentanecarboxamido]penicillanic acid
(13) bis[6-(1-L-3-thio-2-aminopropionamido)cyclopentanecarboxamido]penicillanic acid

*Example XIII.—6-[o-(2-amino-2-phenylacetamido) benzamido] penicillanic acid*

Mix 404 mg. (1.2 millimoles) of 6-(o-aminobenzamido)penicillanic acid with 212 mg. (1.2 millimoles) of D-phenylglycine-N-carboxyanhydride in 30 ml. of ice-cold water. Stir at 1–2° for 60 minutes, keeping the pH at 6.0 by the addition of 1 N NaOH. Filter, and freeze-dry the filtrate. The product is active against *Staph. aureus* and *E. coli*.

*Example XIV.—6-[2-(D-2-amino-4-methylvaleramido)-5-nitrobenzamido]penicillanic acid*

Mix 304 mg. (0.8 millimole) of 6-(2-amino-5-nitrobenzamido)penicillanic acid with 126 mg. (0.8 millimole) of the N-carboxyanhydride of D-leucine in 20 ml. of ice-cold water. Stir at 1–2° for 60 minutes, keeping the pH at 6.0 by the addition of 1 N NCl. Filter, and freeze-dry the filtrate. The product is active against both *Staph. aureus* and *E. coli*.

*Example XV*

When in the procedure of Example XIV, the N-carboxyanhydride of D-leucine is replaced by 0.8 millimole of the N-carboxyanhydride of (1) D-phenylglycine
(2) L-phenylalanine
(3) 1-aminocyclobutane carboxylic acid
(4) 1-aminocyclopentane carboxylic acid
(5) 1-aminocyclohexane carboxylic acid
(6) 1-aminocyclooctane carboxylic acid
(7) anthranilic acid
(8) 2-amino-5-nitrobenzoic acid
(9) 2-amino-5-chlorobenzoic acid
(10) D-tryptophan
(11) L-tryptophan
(12) DL-phenylsarcosine
(13) L-cystine respectively, the following corresponding penicillin derivatives, all active against Gram-positive and Gram-negative microorganisms, are produced (1) 6-[2-(D-2-amino-2-phenylacetamido)-5-nitrobenzamido]penicillanic acid
(2) 6-[2-L-2-amino-3-phenylpropionamido-5-nitrobenzamido]penicillanic acid
(3) 6-[2-(1-aminocyclobutane carboxamido)-5-nitrobenzamido]penicillanic acid
(4) 6-[2-(1-aminocyclopentanecarboxamido)-5-nitrobenzamido]penicillanic acid
(5) 6-[2-(1-aminocyclohexanecarboxamido)-5-nitrobenzamido]penicillanic acid
(6) 6-[2-(1-aminocyclooctanecarboxamido)-5-nitrobenzamido]penicillanic acid
(7) 6-[2-(2-aminobenzamido)-5-nitrobenzamido] penicillanic acid
(8) 6-[2-(2-amino-5-nitrobenzamido)-5-nitrobenzamido]penicillanic acid
(9) 6-[2-(2-amino-5-chlorobenzamido)-5-nitrobenzamido]penicillanic acid
(10) 6-[2-(D-α-aminoindole-3-propionamido)-5-nitrobenzamido]penicillanic acid
(11) 6-[2-(L-α-aminoindole-3-propionamido)-5-nitrobenzamido]penicillanic acid
(12) 6-[2-(DL-2-methylamino-2-phenylacetamido)-5-nitrobenzamido]penicillanic acid
(13) bis[6-(2-L-3-thio-2-aminopropionamido)-5-nitrobenzamido]penicillanic acid

*Example XVI.—6-[L-2-amino-2-phenylacetamido)indole-3-propionamido]penicillanic acid*

Mix 482 mg. (1.2 millimoles) of 6-(L-α-amino-β-indole-3-propionamido)-penicillanic acid with 212 mg. (1.2 millimoles) of D-phenylglycine-N-carboxyanhydride in 30 ml. of ice-cold water. Stir at 1–2° for 60 minutes, keeping the pH at 6.0 by the addition of 1 N NaOH. Filter, and freeze-dry the filtrate. The product is active against *Staph. aureus* and *E. coli*.

*Example XVII.—6-[D-α-(2-aminoacetamido)indole-3-propionamido]penicillanic acid*

Mix 161 mg. (0.4 millimole) of 6-(D-α-aminoindole-3-propionamido)-penicillanic acid with 40 mg. (0.4 millimole) of the N-carboxyanhydride of glycine in 10 ml. of ice-cold water. Stir at 1–2° for 60 minutes, keeping the pH at 6.0 by the addition of 1 N NaOH. Filter, and freeze-dry the filtrate. The product is active against both *Staph. aureus* and *E. coli*.

*Example XVIII*

When in the procedure of Example XVII, the N-carboxyanhydride of glycine is replaced by 0.4 millimole of the N-carboxyanhydride of (1) D-leucine
(2) D-phenylglycine
(3) D-phenylalanine
(4) L-phenylalanine
(5) 1-aminocyclobutanecarboxylic acid
(6) 1-aminocyclopentanecarboxylic acid
(7) anthranilic acid
(8) 2-amino-5-nitrobenzoic acid
(9) D-thyptophan
(10) L-thyptophan
(11) D-methionine
(12) DL-phenylsarcosine
(13) N-phenylglycine
(14) o-ethoxy-DL-phenylglycine
(15) L-cystine respectively, the following corresponding penicillin derivatives, all active against Gram-positive and Gram-negative microorganisms, are produced (1) 6-[D-α-(D-2-amino-4-methylvaleramido)indole-3-propionamido]penicillanic acid
(2) 6-[D-α-(D-2-amino-2-phenylacetamido)indole-3-propionamido]penicillanic acid
(3) 6-[D-α-(D-2-amino-3-phenylpropionamido)indole-3-propionamido]penicillanic acid
(4) 6-[D-α-(L-2-amino-3-phenylpropionamido)indole-3-propionamido]penicillanic acid
(5) 6-[D-α-(1-aminocyclobutanecarboxamido)indole-3-propionamido]penicillanic acid
(6) 6-[D-α-(1-aminocyclopentanecarboxamido)indole-3-propionamido]penicillanic acid
(7) 6-[D-α-(2-aminobenzamido)indole-3-propionamido] penicillanic acid
(8) 6-[D-α-(2-amino-5-nitrobenzamido)indole-3-propionamido]penicillanic acid (9) 6-[D-α-(D-α-aminoindole-3-propionamido)indole-3-propionamido]penicillanic acid
(10) 6-[D-α-(L-α-aminoindole-3-propionamido)indole-3-propionamido]penicillanic acid
(11) 6-[D-α-(D-2-amino-4-methylthiobutyramido)indole-3-propionamido]penicillanic acid
(12) 6-[D-α-(DL-2-methylamino-2-phenylacetamido)indole-3-propionamido]penicillanic acid
(13) 6-[D-α-(2-anilinoacetamido)indole-3-propionamido]penicillanic acid
(14) 6-[D-α-(DL-2-amino-2-o-ethoxyphenylacetamido)indole-3-propionamido]penicillanic acid
(15) bis[6-(D-α-L-3-thio-2-aminopropionamido)indole-3-propionamido]penicillanic acid

*Example XIX.—6-[DL-2-(o-aminobenzamido)-N-methyl-2-phenylacetamido]penicillanic acid*

Mix 290 mg. (0.8 millimole) of 6-(DL-N-methyl-2-aminophenylacetamido)-penicillanic acid with 130 mg. (0.8 millimole) of isatoic anhydride in 200 ml. of ice-cold water. Stir at 1–2° for 60 minutes, keeping the pH at 6.0 by the addition of 1 N NaOH. Filter, and freeze-dry the filtrate. The product is active against *Staph. aureus* and *E. coli*.

*Example XX.—6-[DL-2-(2-amino-5-nitrobenzamido)-N-methyl-2-phenylacetamido]penicillanic acid*

Mix 290 mg. (0.8 millimole) of 6-(DL-N-methyl-2-aminophenylacetamido)-penicillanic acid with 165 mg. (0.8 millimoles) of 6-nitroisatoic anhydride in 20 ml. of ice-cold water. Stir at 1–2° for 60 minutes, keeping the pH at 6.0 by the addition of 1 N NaOH. Filter, and freeze-dry the filtrate. The product is active against *Staph. aureus* and *E. coli*.

*Example XXI.—6-[DL-2-(2-amino-5-methyl-N-methylbenzamido)-2-phenylacetamido]penicillanic acid*

Mix 363 mg. (1 millimole) of 6-(DL-N-methyl-2-aminophenylacetamido)penicillanic acid with 151 (1 millimole) of 6-methylisatoic anhydride in 25 ml. of ice-cold water. Stir at 1–2° for 60 minutes, keeping the pH at 6.0 by the addition of 1 N NaOH. Filter, and freeze-dry the filtrate. The product is active against both Gram-positive and Gram-negative organisms.

*Example XXII*

When in the procedure of Example XX, 6-nitroisatoic anhydride is replaced by 0.8 millimole of the N-carboxyanhydride of (1) 1-aminocyclopropanecarboxylic acid
(2) 1-aminocyclodecanecarboxylic acid
(3) 2-amino-3-naphthoic acid
(4) 2-methylamino-5-nitrobenzoic acid
(5) L-α-amino-5-methylindole-3-propionic acid
(6) L-α-amino-5-ethylindole-3-propionic acid
(7) L-α-amino-5-methoxyindole-3-propionic acid
(8) D-2-amino-3-(ethylthio)-propionic acid
(9) DL-2-amino-3-(methylthio)-propionic acid
(10) DL-2-amino-7-(methylthio)-heptanoic acid
(11) D-ethionine
(12) DL-2-ethylamino-2-phenylglycine
(13) DL-2-amylamino-2-phenylglycine
(14) 2-carboxytrimethyleneimine
(15) 2-carboxyoctamethyleneimine the corresponding penicillin derivatives, all active against Gram-positive and Gram-negative microorganisms, are produced.

*Example XXIII*

When in the procedure of Example XIX, the 6-(DL-N-methyl-2-aminophenylacetamido)penicillanic acid is replaced by 0.8 millimole of 6-(2-anilinoacetamido)penicillanic acid and the isatoic anhydride by glycine-N-carboxyanhydride, there is produced 6-[2-(D-2-amino-N-phenylacetamido)acetamido]penicillanic acid, which is active against both Gram-positive and Gram-negative microorganisms.

*Example XXIV*

When in the procedure of Example XXIII, the 6-(2-anilinoacetamido)penicillanic acid is replaced by 0.8 millimole of 6-(DL-N-ethyl-2-aminophenylacetamido)-penicillanic acid, the corresponding penicillin product, active against both Gram-positive and Gram-negative microorganisms, is produced.

*Example XXV*

When in the procedure of Example XXIII, the 6-(2-anilinoacetamido)penicillanic acid is replaced by 0.8 millimole of 6-(DL-N-amyl-2-aminophenylacetamido)penicillanic acid, the corresponding penicillin product, active against both Gram-positive and Gram-negative microorganisms, is produced.

*Example XXVI.—6-[DL-α-(o-aminobenzamido)glutaramamido]penicillanic acid*

Mix 275 mg. (0.8 millimole) of 6-(DL-α-aminoglutaramamido)penicillanic acid with 130 mg. (0.8 millimole) of isatoic anhydride in 20 ml. of ice-cold water. Stir at 1–2° for 60 minutes, keeping the pH at 6.0 by the addition of 1 N NaOH. Filter, and freeze-dry the filtrate. The product is active against *Staph. aureus* and *E. coli*.

*Example XXVII.—6-[DL-α-(2-amino-5-nitrobenzamido)glutaramido]penicillanic acid*

Mix 290 mg. (0.8 millimole) of 6-(DL-α-aminoglutaramamido)-penicillanic acid with 165 mg. (0.8 millimole) of 6-nitroisatoic anhydride in 20 ml. of ice-cold water. Stir at 1–2° for 60 minutes keeping the pH at 6.0 by the addition of 1 N NaOH. Filter, and freeze-dry the filtrate. The product is active against *Staph. aureus* and *E. coli*.

*Example XXVIII*

When in the procedure of Example XXVII, 6-nitroisatoic anhydride is replaced by 0.8 millimole of the N-carboxyanhydride of (1) 1-aminocyclopropanecarboxylic acid
(2) 1-aminocyclodecanecarboxylic acid
(3) 2-amino-3-naphthoic acid
(4) 2-methylamino-5-nitrobenzoic acid
(5) L-α-amino-5-methylindole-3-propionic acid
(6) L-α-amino-5-ethylindole-3-propionic acid
(7) L-α-amino-5-methoxyindole-3-propionic acid
(8) D-2-amino-3-(ethylthio)-propionic acid
(9) DL-2-amino-3-(methylthio)-propionic acid
(10) DL-2-amino-7-(methylthio)-heptanoic acid
(11) D-ethionine
(12) DL-2-ethylamino-2-phenylglycine
(13) DL-2-amylamino-2-phenylglycine
(14) 2-carboxytrimethyleneimine
(15) 2-carboxyoctamethyleneimine the corresponding penicillin derivatives, all active against Gram-positive and Gram-negative microorganisms, are produced.

*Example XXIX.—6-[L-1-(2-aminoacetamido)-2-pyrrolidinecarboxamido]penicillanic acid*

Mix 312 mg. (1 millimole) of 6-(L-2-pyrrolidinecarboxamido)penicillanic acid with 100 mg. (1 millimole) of the N-carboxyanhydride of glycine in 25 ml. of ice-cold water. Stir at 1–2° for 60 minutes, keeping the pH at 6.0 by the addition of 1 N NaOH. Filter, and freeze-dry the filtrate. The product is active against both *Staph. aureus* and *E. coli*.

*Example XXX*

When in the procedure of Example XXIX, the N-carboxyanhydride of glycine is replaced by 1 millimole of the N-carboxyanhydride of (1) D-phenylglycine
(2) D-leucine
(3) 1-aminocyclobutanecarboxylic acid
(4) 1-aminocyclopentanecarboxylic acid
(5) 1-aminocyclohexanecarboxylic acid
(6) anthranilic acid
(7) 2-amino-5-nitrobenzoic acid
(8) 2-methylamine-5-nitrobenzoic acid
(9) D-tryptophan respectively, the following corresponding penicillin derivatives, all active against Gram-positive and Gram-negative microorganisms, are produced:

(1) 6-[L-1-(D-2-amino-2-phenylacetamido)-2-pyrrolidinecarboxamido]penicillanic acid
(2) 6-[L-1-(D-2-amino-4-methylvaleramido)-2-pyrrolidinecarboxamido]penicillanic acid
(3) 6-[L-1-(1-aminocyclobutanecarboxamido)-2-pyrrolidinecarboxamido]penicillanic acid
(4) 6-[L-1-(1-aminocyclopentanecarboxamido)-2-pyrrolidinecarboxamido]penicillanic acid
(5) 6-[L-1-(1-aminocyclohexanecarboxamido)-2-pyrrolidinecarboxamido]penicillanic acid
(6) 6-[L-1-(2-aminobenzamido)-2-pyrrolidinecarboxamido]penicillanic acid
(7) 6-[L-1-(2-amino-5-nitrobenzamido)-2-pyrrolidinecarboxamido]penicillanic acid
(8) 6-[L-1-(2-methylamine-5-nitrobenzamido)-2-pyrrolidinecarboxamido]penicillanic acid
(9) 6-[L-1-(D-α-aminoindole-3-propionamido)-2-pyrrolidinecarboxamido]penicillanic acid

*Example XXXI*

When in the procedure of Example XXIX, the N-carboxyanhydride of glycine is replaced by 1 millimole of the N-carboxyanhydride of (1) 1-aminocyclopropanecarboxylic acid
(2) 1-aminocyclodecanecarboxylic acid
(3) 2-amino-3-naphthoic acid
(4) 2-methylamino-5-nitrobenzoic acid
(5) L-α-amino-5-methylindole-3-propionic acid
(6) L-α-amino-5-ethylindole-3-propionic acid
(7) L-α-amino-5-methoxyindole-3-propionic acid
(8) D-2-amino-3-(ethylthio)-propionic acid
(9) DL-2-amino-3-(methylthio)-propionic acid
(10) DL-2-amino-7-(methylthio)-heptanoic acid
(11) D-ethionine
(12) DL-2-ethylamino-2-phenylglycine
(13) DL-2-amylamino-2-phenylglycine
(14) 2-carboxytrimethyleneimine
(15) 2-carboxyoctamethyleneimine the corresponding penicillin derivatives, all active against Gram-positive and Gram-negative microorganisms, are produced.

*Example XXXII*

When in the procedure of Example XXIX, the 6-(L-2-pyrrolidinecarboxamido)penicillanic acid is replaced by 1 millimole of 6-(DL-2-aziridinecarboxamido)penicillanic acid, the corresponding penicillin product, active against both Gram-positive and Gram-negative microorganisms, is produced.

*Example XXXIII*

When in the procedure of Example XXIX, the 6-(L-2-pyrrolidinecarboxamido)penicillanic acid is replaced by 1 millimole of 6-(DL-octahydro-1H-azonine-2-carboxamido)penicillanic acid, the corresponding penicillin product, active against both Gram-positive and Gram-negative microorganisms, is produced.

*Example XXXIV.—6-[D-2-(D-2-amino-2-phenylacetamido)-4-methylthiobutyramido]penicillanic acid*

Mix 416 mg. (1.2 millimoles) of 6-(D-2-amino-4-methylthiobutyramido)penicillanic acid with 212 mg. (1.2 millimoles) of D-phenylglycine-N-carboxyanhydride in 30 ml. of ice-cold water. Stir at 1–2° for 60 minutes, keeping the pH at 6.0 by the addition of 1 N NaOH. Filter, and freeze-dry the filtrate. The product is active against *Staph. aureus* and *E. coli.*

*Example XXXV*

When in the procedure of Example XXXIV, the N-carboxyanhydride of D-phenylglycine is replaced by 1.2 millimoles of the N-carboxyanhydride of (1) 1-aminocyclopropanecarboxylic acid
(2) 1-aminocyclodecanecarboxylic acid
(3) 2-amino-3-naphthoic acid
(4) 2-methylamino-5-nitrobenzoic acid
(5) L-α-amino-5-methylindole-3-propionic acid
(6) L-α-amino-5-ethylindole-3-propionic acid
(7) L-α-amino-5-methoxyindole-3-propionic acid
(8) D-2-amino-3-(ethylthio)-propionic acid
(9) DL-2-amino-3-(methylthio)-propionic acid
(10) DL-2-amino-7-(methylthio)-heptanoic acid
(11) D-ethionine
(12) DL-2-ethylamino-2-phenylglycine
(13) DL-2-amylamino-2-phenylglycine
(14) 2-carboxytrimethyleneimine
(15) 2-carboxyoctamethyleneimine the corresponding penicillin derivatives, all active against Gram-positive and Gram-negative microorganisms, are produced.

*Example XXXVI*

When in the procedure of Example XXXIV, the 6-(D-2-amino-4-methylthiobutyramido)penicillanic acid is replaced by 1.2 millimoles of 6-(D-2-amino-3-ethylthiopropionamido)penicillanic acid, the corresponding penicillin product, active against both *Staph. aureus* and *E. coli,* is produced.

*Example XXXVII*

When in the procedure of Example XXXIV, the 6-(D-2-amino-4-methylthiobutyramido)penicillanic acid is replaced by 1.2 millimoles of 6-(DL-2-amino-3-methylthiopropionamido)penicillanic acid, the corresponding penicillin product, active against both *Staph. aureus* and *E. coli,* is produced.

*Example XXXVIII*

When in the procedure of Example XXXIV, the 6-(D-2-amino-4-methylthiobutyramido)-penicillanic acid is replaced by 1.2 millimoles of 6-(DL-2-amino-7-methylthioheptanamido)penicillanic acid, the corresponding penicillin product, active against both *Staph. aureus* and *E. coli,* is produced.

*Example XXXIX*

When in the procedure of Example XXXIV, the 6-(D-2-amino-4-methylthiobutyramido)penicillanic acid is replaced by 1.2 millimoles of 6-(D-2-amino-4-ethylthiobutyramido)penicillanic acid, the corresponding penicillin product, active against both *Staph. aureus* and *E. coli,* is produced.

*Example XL*

When in the procedure of Example II, the N-carboxyanhydride of D-leucine is replaced by 0.8 millimoles of the N-carboxyanhydride of (1) 1-aminocyclopropanecarboxylic acid
(2) 1-aminocyclodecanecarboxylic acid
(3) 2-amino-3-naphthoic acid
(4) 2-methylamino-5-nitrobenzoic acid
(5) L-α-amino-5-methylindole-3-propionic acid
(6) L-α-amino-5-ethylindole-3-propionic acid
(7) L-α-amino-5-methoxyindole-3-propionic acid
(8) D-2-amino-3-(ethylthio)-propionic acid
(9) DL-2-amino-3-(methylthio)-propionic acid
(10) DL-2-amino-7-(methylthio)-heptanoic acid

(11) D-ethionine
(12) DL-2-ethylamino-2-phenylglycine
(13) DL-2-amylamino-2-phenylglycine
(14) 2-carboxytrimethyleneimine
(15) 2-carboxyoctamethyleneimine the corresponding penicillin derivatives, all active against Gram-positive and Gram-negative microorganisms, are produced.

Example XLI

When in the procedure of Example VII, the N-carboxyanhydride of glycine is replaced by 1.2 millimoles of the N-carboxyanhydride of (1) 1-aminocyclopropanecarboxylic acid
(2) 1-aminocyclodecanecarboxylic acid
(3) 2-amino-3-naphthoic acid
(4) 2-methylamino-5-nitrobenzoic acid
(5) L-α-amino-5-methylindole-3-propionic acid
(6) L-α-amino-5-ethylindole-3-propionic acid
(7) L-α-amino-5-methoxyindole-3-propionic acid
(8) D-2-amino-3-(ethylthio)-propionic acid
(9) DL-2-amino-3-(methylthio)-propionic acid
(10) DL-2-amino-7-(methylthio)-heptanoic acid
(11) D-ethionine
(12) DL-2-ethylamino-2-phenylglycine
(13) DL-2-amylamino-2-phenylglycine
(14) 2-carboxytrimethyleneimine
(15) 2-carboxyoctamethyleneimine the corresponding penicillin derivatives, all active against Gram-positive and Gram-negative microorganisms, are produced.

Example XLII

When in the procedure of Example X, the N-carboxyanhydride of D-phenylglycine is replaced by 1.2 millimoles of the N-carboxyanhydride of (1) 1-aminocyclopropanecarboxylic acid
(2) 1-aminocyclodecanecarboxylic acid
(3) 2-amino-3-naphthoic acid
(4) 2-methylamino-5-nitrobenzoic acid
(5) L-α-amino-5-methylindole-3-propionic acid
(6) L-α-amino-5-ethylindole-3-propionic acid
(7) D-2-amino-3-(ethylthio)-propionic acid
(8) DL-2-amino-3-(methylthio)-propionic acid
(9) DL-2-amino-7-(methylthio)-heptanoic acid
(10) D-ethionine
(11) DL-2-ethylamino-2-phenylglycine
(12) DL-2-amylamino-2-phenylglycine
(13) 2-carboxytrimethyleneimine
(14) 2-carboxyoctamethyleneimine the corresponding penicillin derivatives, all active against Gram-positive and Gram-negative microorganisms, are produced.

Example XLIII

When in the procedure of Example X, the 6-(1-aminocyclobutanecarboxamido)penicillanic acid is replaced by 1.2 millimoles of 6-(1-aminocyclopropanecarboxamido)penicillanic acid, the corresponding penicillin product, active against both Gram-positive and Gram-negative microorganisms, is produced.

Example XLIV

When in the procedure of Example X, the 6-(1-aminocyclobutanecarboxamido)penicillanic acid is replaced by 1.2 millimoles of 6-(1-aminocyclodecanecarboxamido)penicillanic acid, the corresponding penicillin product, active against both Gram-positive and Gram-negative microorganisms, is produced.

Example XLV

When in the procedure of Example XIII, the N-carboxyanhydride of D-phenylglycine is replaced by 1.2 millimoles of the N-carboxyanhydride of (1) 1-aminocyclopropanecarboxylic acid
(2) 1-aminocyclodecanecarboxylic acid
(3) 2-amino-3-naphthoic acid
(4) 2-methylamino-5-nitrobenzoic acid
(5) L-α-amino-5-methylindole-3-propionic acid
(6) L-α-amino-5-ethylindole-3-propionic acid
(7) L-α-amino-5-methoxyindole-3-propionic acid
(8) D-2-amino-3-(ethylthio)-propionic acid
(9) DL-2-amino-3-(methylthio)-propionic acid
(10) DL-2-amino-7-(methylthio)-heptanoic acid
(11) D-ethionine
(12) DL-2-ethylamino-2-phenylglycine
(13) DL-2-amylamino-2-phenylglycine
(14) 2-carboxytrimethyleneimine
(15) 2-carboxyoctamethyleneimine the corresponding penicillin derivatives, all active against Gram-positive and Gram-negative microorganisms, are produced.

Example XLVI

When in the procedure of Example XIII, the 6-(o-aminobenzamido)penicillanic acid is replaced by 1.2 millimoles of 6-(2-amino-3-naphthamido)penicillanic acid, the corresponding penicillin product, active against Staph. aureus and E. coli, is produced.

Example XLVII

When in the procedure of Example XIII, the 6-(o-amino-benzamido)penicillanic acid is replaced by 1.2 millimoles of 6-(N-methyl-2-amino-5-nitrobenzamido)penicillanic acid, the corresponding penicillin product, active again Staph. aureus and E. coli, is produced.

Example XLVIII

When in the procedure of Example XVI, the N-carboxyanhydride of D-phenylglycine is replaced by 1.2 millimoles of the N-carboxyanhydride of (1) 1-aminocyclopropanecarboxylic acid
(2) 1-aminocyclodecanecarboxylic acid
(3) 2-amino-3-naphthoic acid
(4) 2-methylamino-5-nitrobenzoic acid
(5) L-α-amino-5-methylindole-3-propionic acid
(6) L-α-amino-5-ethylindole-3-propionic acid
(7) L-α-amino-5-methoxyindole-3-propionic acid
(8) D-2-amino-3-(ethylthio)-propionic acid
(9) DL-2-amino-3-(methylthio)-propionic acid
(10) DL-2-amino-7-(methylthio)-heptanoic acid
(11) D-ethionine
(12) DL-2-ethylamino-2-phenylglycine
(13) DL-2-amylamino-2-phenylglycine
(14) 2-carboxytrimethyleneimine
(15) 2-carboxyoctamethyleneimine the corresponding penicillin derivatives, all active against Gram-positive and Gram-negative microorganisms, are produced.

Example XLIX

When in the procedure of Example XVI, the 6-(L-α-amino-β-indole-3-propionamido)penicillanic acid is replaced by 1.2 millimoles of 6-(L-α-amino-5-methylindole-3-propionamido)penicillanic acid, the corresponding penicillin product, active against both Staph. aureus and E. coli, is produced.

Example L

When in the procedure of Example XVI, the 6-(L-α-amino-β-indole-3-propionamido)penicillanic acid is replaced by 1.2 millimoles of 6-(L-α-amino-5-ethylindole-3-propionamido)penicillanic acid, the corresponding penicillin product, active against both Staph. aureus and E. coli, is produced.

Example LI

When in the procedure of Example XVI, the 6-(L-α-amino-β-indole-3-propionamide)penicillanic acid is replaced by 1.2 millimoles of 6-(L-α-amino-5-methoxyindole-3-propionamido)penicillanic acid, the corresponding penicillin product, active against both *Staph. aureus* and *E. coli*, is produced.

As will be understood by those skilled in the art, the compounds of the invention may be utilized in their acid form or in the form of the therapeutically-active salts thereof, e.g., the sodium or potassium salts, or hydrochloride, etc., or in the form of the pharmaceutically-acceptable acid-addition salts prepared by the reaction of the penicillin compounds with an amine or diamine base, e.g., procaine, or various N,N'-disubstituted alkylenediamines, such as N,N'-dibenzylethylene-diamine, etc.

We claim:
1. The process for producing 6-(α-amino-acylamino-acylamino)-penicillanic acids which comprises reacting, in an aqueous acidic medium at a pH of from about 3.8 to about 7.4 and at a temperature from just above the freezing point of said aqueous acidic medium to about 70° C. the following:

(1) a 6-(α-amino-acylamino)-penicillanic acid of the formula:

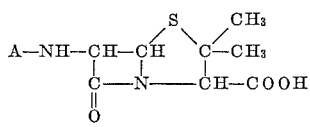

wherein A is a radical having a formula of the group consisting of the following:

(a)

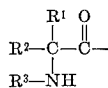

wherein
$R^1$ is of the group consisting of hydrogen and lower alkyl;
$R^2$ is of the group consisting of hydrogen, lower alkyl, phenyl, (lower)alkylphenyl, nitrophenyl, halophenyl, phenyl(lower)alkyl, (lower)alkoxyphenyl, (lower)cycloalkyl, amido(lower)alkyl, (lower)alkylthio(lower)alkyl, indoly(lower)alkyl, (lower)alkylindolyl(lower)alkyl, (lower)alkoxyindolyl(lower)alkyl;
$R^1$ and $R^2$, when joined together, complete a ring which is lower cycloalkyl; and
$R^3$ is hydrogen, and, when joined with $R^2$, completes a pyrrolidine ring; and (b)

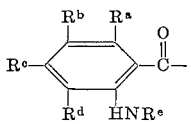

wherein each of $R^a$, $R^b$, $R^c$, and $R^d$ is selected from the group consisting of hydrogen, lower alkyl, nitro, sulfo, halo and hydroxy; $R^e$ is of the group consisting of hydrogen and lower alkyl; and each of $R^a$ and $R^b$, $R^b$ and $R^c$, and $R^c$ and $R^d$, when respectively joined together complete a fused ring which is naphthalene; with (2) an N-carboxy-amino acid anhydride having a formula of the group consisting of the following:

(a)

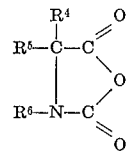

wherein
$R^4$ is of the group consisting of hydrogen and lower alkyl;
$R^5$ is of the group consisting of hydrogen, lower alkyl, phenyl, (lower)alkylphenyl, nitrophenyl, halophenyl, phenyl(lower)alkyl, (lower)alkoxyphenyl, (lower)cycloalkyl, amino(lower)alkyl, (lower)alkylthio(lower)alkyl, indolyl(lower)alkyl, (lower)alkylindolyl(lower)alkyl, (lower)alkoxyindolyl(lower)alkyl;
$R^4$ and $R^5$, when joined together, complete a ring which is lower cycloalkyl; and
$R^6$ is hydrogen, and, when joined with $R^5$, completes a pyrrolidine ring; and (b)

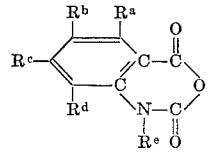

wherein each of $R^a$, $R^b$, $R^c$, and $R^d$ is selected from the group consisting of hydrogen, lower alkyl, nitro, sulfo, halo and hydroxy; $R^e$ is of the group consisting of hydrogen and lower alkyl; and each of $R^a$ and $R^b$, $R^b$ and $R^c$, $R^c$ and $R^d$, when respectively joined together, complete a fused ring which is naphthalene.

2. The process of claim 1 wherein an inorganic base is included for maintaining the medium within the stated pH range.

3. The process of claim 2 wherein the pH range is from 4.7 to 7.0.

References Cited by the Examiner
UNITED STATES PATENTS
3,206,455  9/1965  Alburn et al. _____ 260—239.1

ALEX MAZEL, *Primary Examiner.*
HENRY R. JILES, *Examiner.*
JAMES W. ADAMS, Jr., *Assistant Examiner.*